Figure 1:
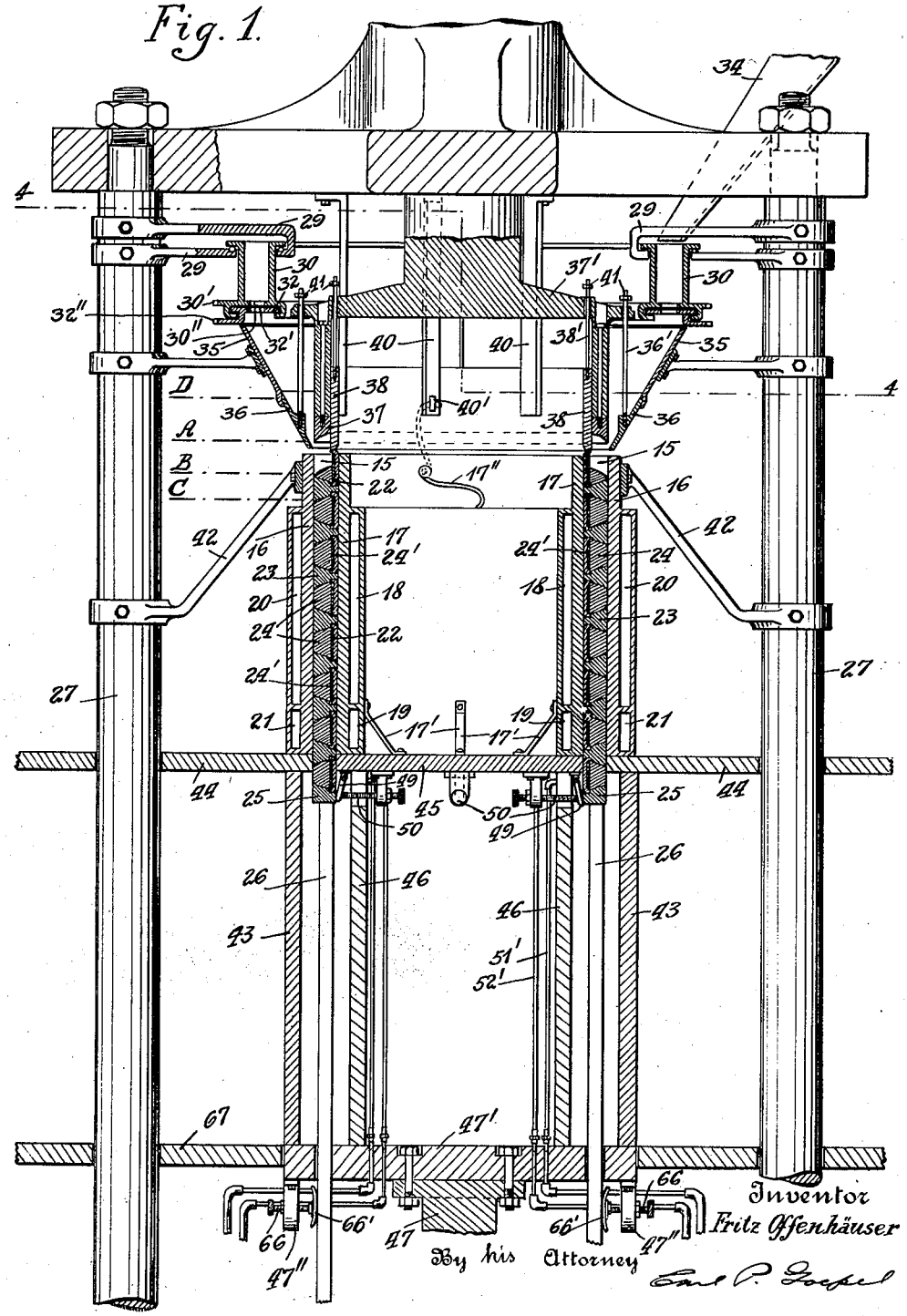

F. OFFENHÄUSER.
FORCED ARTICLES AND PROCESS AND APPARATUS FOR MAKING THE SAME.
APPLICATION FILED APR. 25, 1918.

1,390,375.

Patented Sept. 13, 1921.
4 SHEETS—SHEET 2.

Inventor
Fritz Offenhäuser
By his Attorney

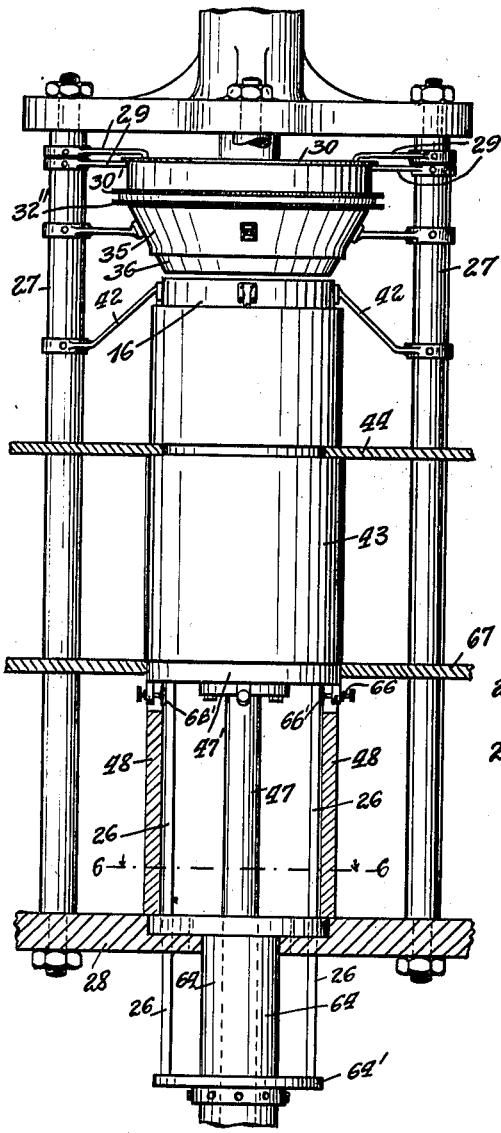
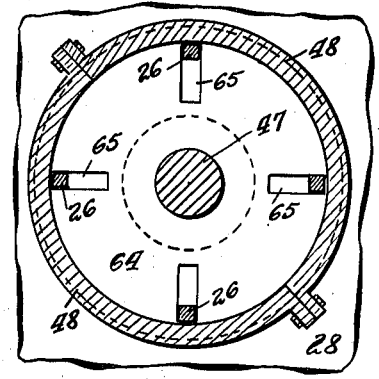
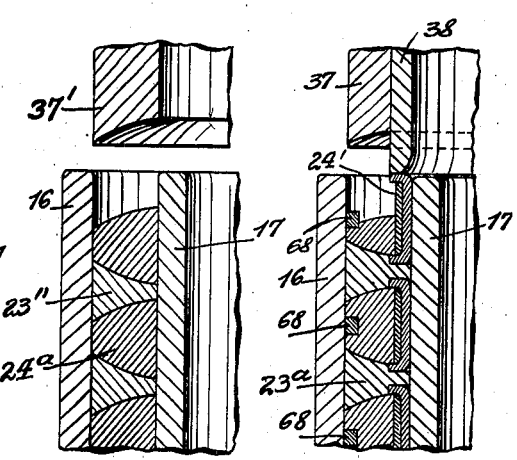
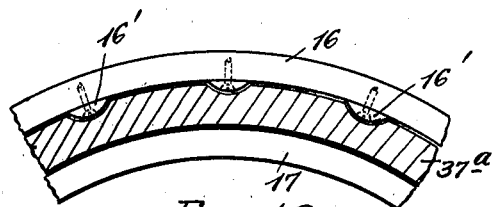

F. OFFENHÄUSER.
FORCED ARTICLES AND PROCESS AND APPARATUS FOR MAKING THE SAME.
APPLICATION FILED APR. 25, 1918.
1,390,375.
Patented Sept. 13, 1921.
4 SHEETS—SHEET 4.
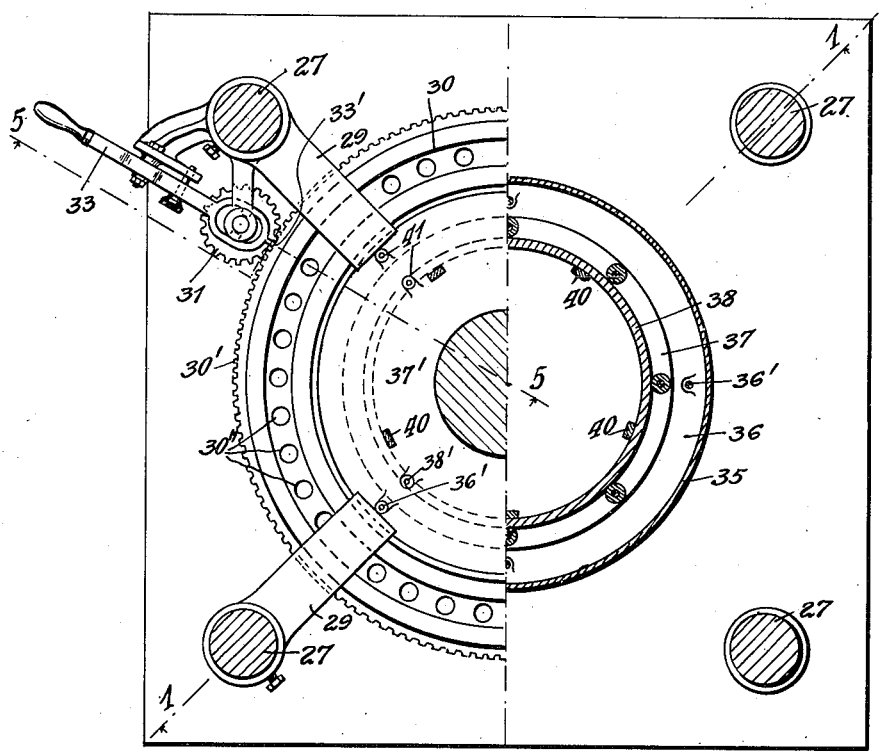
Fig. 4.
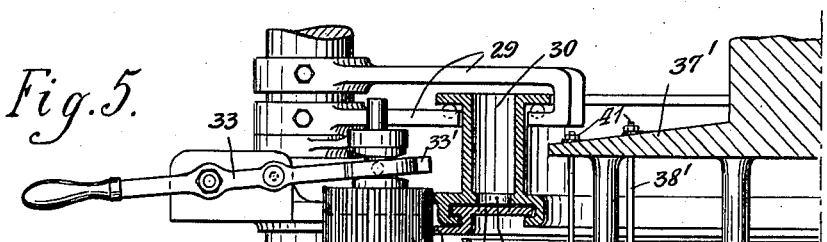
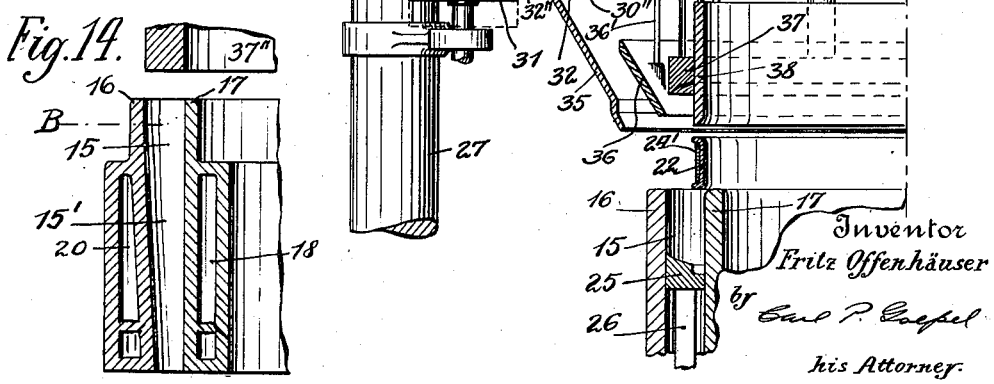
Inventor
Fritz Offenhäuser
by
his Attorney.

UNITED STATES PATENT OFFICE.

FRITZ OFFENHÄUSER, OF TARRYTOWN, NEW YORK.

FORCED ARTICLES AND PROCESS AND APPARATUS FOR MAKING THE SAME.

1,390,375.  Specification of Letters Patent.  Patented Sept. 13, 1921.

Application filed April 25, 1918. Serial No. 230,751.

*To all whom it may concern:*

Be it known that I, FRITZ OFFENHÄUSER, a citizen of the United States, and resident of Tarrytown, county of Westchester, State of New York, have invented certain new and useful Improvements in Forced Articles and Processes and Apparatus for Making the Same, of which the following is a specification.

My invention relates to the making of rubber tires and other articles by the so-called "forcing" process, that is to say, a process during which the material under treatment is caused to travel through a mold, as distinguished from operations in which the material is stationary during the treatment. My invention is especially applicable to the making of articles from powdered material by intermittent plunger pressure with the introduction of additional material between successive plunger strokes. In making tires or so-called "forcing lengths" by pressure exerted on traveling material, the practice prevailing hitherto has been to employ a pressure directed lengthwise, that is to say, circumferentially with respect to the finished tire. The resulting article or "forced length" therefore had two ends, and to make it into a tire, these ends had to be joined, which not only added to the expense of manufacture, but was liable to create a weak spot in the tire. In contradistinction to this well known process, my present invention contemplates applying the forcing pressure transversely, that is to say, when a tire or other annular article is to be produced, in a direction parallel to the axis of the tire or like article, and I am thus enabled to "force" annular articles having no joint and therefore superior in this respect to the articles produced according to the usual practice above referred to. Also, the individual portions or layers produced by the successive plunger strokes will not range transversely of the "forced" article, as hereto, but lengthwise or circumferentially thereof, which is an advantage for certain reasons pointed out hereinafter. My improved method and the apparatus I have devised for carrying it out, also present numerous other novel features resulting in the production of greatly improved articles, as will be more fully set forth hereinafter. Another advantage of this apparatus and procedure is that the forcing and vulcanizing operations may be practically simultaneous, this effecting a great saving in time, labor and expense.

Figure 2:
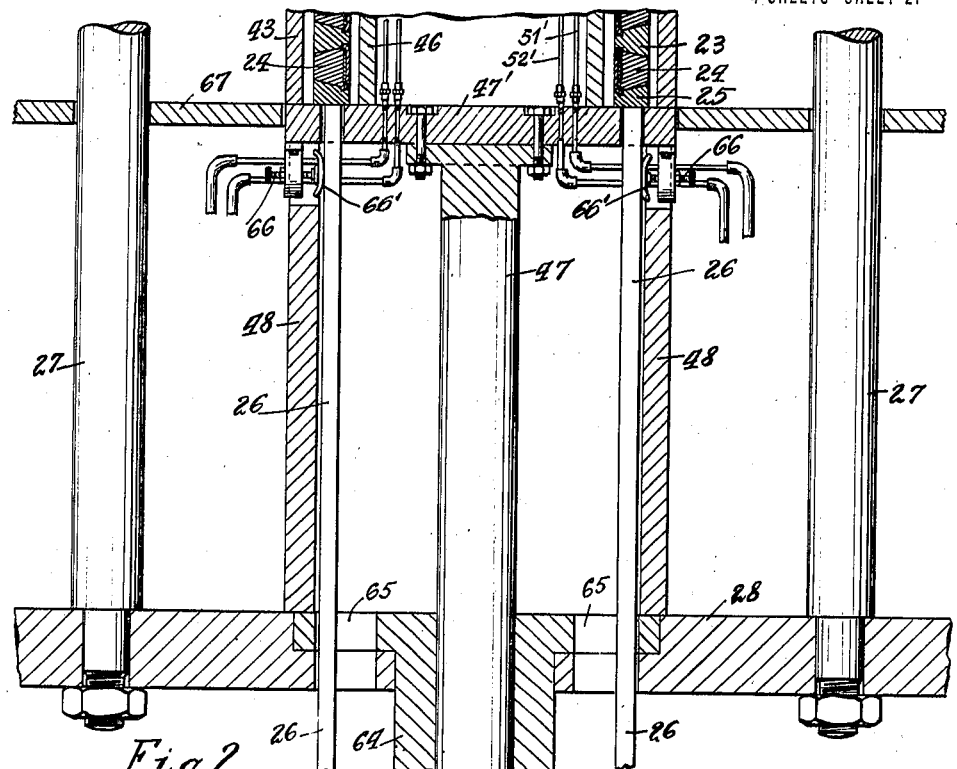
Figures 7, 8, 9:
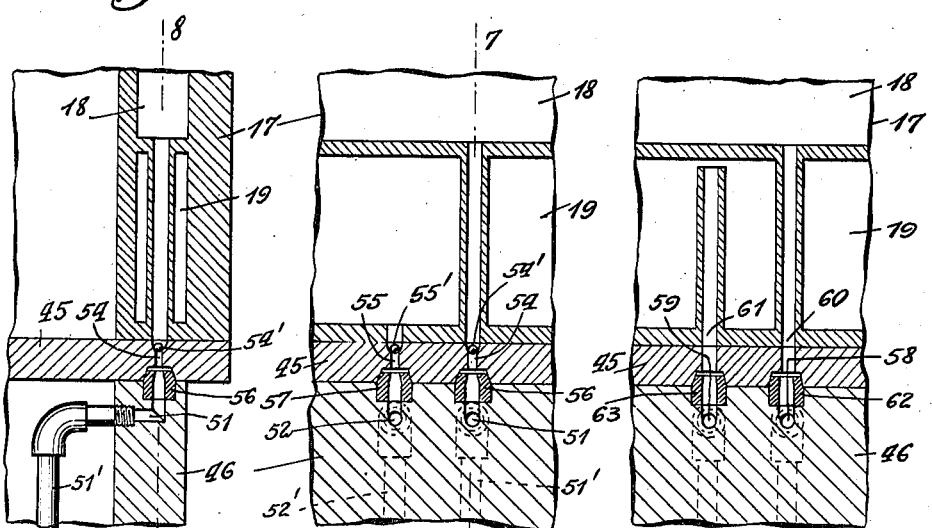

An example of an apparatus suitable for carrying out my invention is shown in the accompanying drawings, in which Figure 1 is a central vertical section through the upper portion of said apparatus, taken on line 1—1 of Fig. 4; Fig. 2 is a similar view of the lower portion. Fig. 3 is a front elevation of the entire apparatus. Fig. 4 is a horizontal section on line 4—4 of Fig. 1; Fig. 5 is a partial vertical section on line 5—5 of Fig. 4; Fig. 6 is a partial horizontal section on line 6—6 of Fig. 3; Fig. 7 is a vertical section on line 7—7 of Fig. 8; Fig. 8 is a vertical section taken circumferentially of the inner wall of the mold chamber substantially on line 8—8 of Fig. 7; Fig. 9 is a section similar to Fig. 8, but taken at a different point of said inner wall; Figs. 10, 11 and 13 are partial vertical sections illustrating the manufacture of different articles in accordance with my invention; Fig. 14 is a sectional detail of the annular mold chamber, and Fig. 12 is a partial horizontal section of a slight modification.

In the particular example illustrated, the apparatus comprises an annular mold of circular cross section, the axis of said mold being vertical. The annular mold chamber 15 is formed between an outer cylindrical wall 16 and an inner cylindrical wall 17 coaxial therewith. On the inside of the inner mold member 17, I provide two annular jackets 18 and 19 respectively, of which the upper jacket 18 is adapted to receive a heating medium (say steam) through suitable connections (described hereinafter), while the lower jacket 19, the height of which is smaller, is adapted to receive a cooling medium (say cold water). Similarly, a heating jacket 20 and a cooling jacket 21 provided with suitable inlet and outlet connections (not shown), surround the outer mold member 16, each of the upper jackets 18 and 20 being independent of the other as regards its supply of heating medium, so that if desired, the inside and the outside of the mold may be heated to different temperatures. The lower jackets, 19, 21 may extend to the bottom of the mold, as shown, but the upper jackets preferably terminate short of the upper end of the mold to avoid excessive heating of this end, as will be more fully explained below. The inner jackets preferably terminate at the same levels as the corresponding outer jackets.

It will be understood that there is no direct connection between the inner mold member and the outer mold member across the mold chamber 15, so that this chamber is unobstructed for the passage downwardly therethrough, of the articles in process of manufacture and certain adjuncts, as will be explained presently.

Along the inner face of the mold chamber 15 are adapted to slide the annular tire channels or metal bases 22, such as are commonly used for solid tires and particularly truck tires. Adjacent bases 22 are held apart by separator rings 23, of a proper width (measured horizontally) to fit into the mold chamber 15, with a sliding fit on the opposing walls of the mold members 16, 17. The upper and lower surfaces of these separator rings are shaped to fit the corresponding ends of the bases 22 and the side surfaces (top and bottom in the drawing) of the tire or other annular article to be produced; several such articles (tires) being shown at 24. The lowermost base 22 rests on a bottom ring 25 shaped like the upper half of one of the separator rings 23, so that this bottom ring has a horizontal lower surface engaging the upper end or surface of a suitable support or supports as hereinafter referred to, for instance four rods 26.

The following mechanism may be employed to feed the powdered rubber compound or like material to the annular mold chamber uniformly: To suitable stationary parts, such as the columns 27 resting on the base 28, I secure brackets 29 carrying an annular channel or trough 30. This trough might be stationary and filled by hand through its open top, but I have shown a mechanical filling device which contemplates rotating the trough about its vertical axis, which coincides with the axis of the mold. For this purpose, the brackets 29 are provided with suitable bearing surfaces on which the trough 30 may rotate, being driven say by a pinion 31 in engagement with a spur gear 30' on the trough. The bottom of the trough has apertures 30" adapted to register with openings 32' in a shutter or distributing plate 32 located under said bottom. The pinion 31 may also engage a spur gear 32" rigidly connected with the distributing plate 32, the latter being rotatable relatively to the trough 30 about the vertical axis of the trough and of the mold. The pinion 31 may be moved lengthwise of its axis, say by means of a shifting lever 33 of well known character, and in the upper position the pinion will engage and drive the trough 30 in unison with the shutter or distributer 32, the teeth of the spur gears 30' and 32" being preferably so disposed as to insure the closing of the apertures 30" by the shutter 32 when the trough and the shutter are both in mesh with the pinion 31. In any event, the shutter should be brought to the closing position when the trough is to be rotated. As the trough rotates, all points of its circumference will be brought successively under the outlet of the stationary feed spout 34 from which a stream of powdered material is being discharged continually, and thus the material will be deposited to a uniform height in the said trough. This height will of course depend on the amount of material required for the particular article to be made. When the trough has thus been filled, the molding operation described below can be started, and during this molding operation the material will be discharged from the trough into the mold. For this purpose the distributing plate 32 will be rotated while holding the trough stationary, so that the openings 30" and 32' will alternately come into and out of registry. This may be accomplished in the construction shown, by shifting the pinion 31 to a position in which it will mesh only with the spur gear 32" (see dotted lines), and at the same time a projection 33' of the shifting lever 33 may drop into one of the tooth spaces of the spur gear 30' to lock the trough 30 against rotation. The material dropping through the holes 30", 32' as they register during the rotation of the shutter or distributer 32 relatively to the stationary trough 30, will be received by a stationary inclined or conical wall or funnel 35 connected at its bottom with a discharge portion 36, the lower edge of which is shown as normally resting slightly above the upper end of the outer mold member. It will be understood that this mechanism will supply the material uniformly all around the mold chamber 15.

For the compression and forming of the powdered material supplied from the trough 30 to the annular mold chamber 15, I provide an annular plunger 37 coaxial with the said chamber and arranged to reciprocate vertically with its cylindrical outer surface in sliding fit against the inner surface of the outer mold member 16. This compressing plunger has its lower face shaped like the outer portion of the lower face of one of the separator rings 23, and the inner cylindrical surface of said plunger 37 will be substantially flush with the outer edges of the flanges of the bases 22. That is to say, the width or thickness of the compressing plunger (measured radially) will be smaller than the width of the mold chamber 15, by an amount approximately equal to the radial width of the mold chamber portion occupied by the bases 22 (including their flanges).

In sliding engagement with the inner cylindrical surface of the compressing plunger 37 is arranged an annular presser or follower 38, of a radial width practically equal to that of the bases 22 (including their flanges) and adapted to have its lower end normally in contact with the upper end of the uppermost base 22. The inner cylindrical surface of the follower 38 is thus adapted for sliding engagement with the outer surface of the inner mold member 17, while the outer surface of the follower will be flush with the outer or free end surface of the upper flange of the uppermost base 22. However, it is not essential to have the follower engage the inner mold member. To keep the follower normally down against the uppermost base 22, I may rely on its weight alone, although if this is not sufficient, springs or other devices may be employed to assist in keeping the follower down. The follower may be further guided and steadied, if desired, by engagement with stationary vertical rods or bars 40 extending through openings in the plunger head 37'. The main purpose of these guides, however, is to assist in securing an absolutely rectilinear motion of the compressing plunger 37. This plunger is operated in any suitable manner, preferably by hydraulic mechanism (not shown) of well known character, and for reasons explained below, it is desirable that the valves or other devices controlling the movement of the plunger should be adjustable to different positions, one of such positions giving the plunger its normal or compressing stroke, which is relatively short, while with other positions of the controlling valves the plunger can be made to rise above the upper end of its normal compressing stroke, or to descend beyond the lower end of such stroke. It is desirable, for a purpose explained below, that when the plunger 37 is thus raised above the upper limit of its normal compressing stroke, the follower 38 and the extension 36 should be raised also. This may be accomplished by means of vertical rods 36', 38' secured to said extension and to the follower respectively, and passing with a sliding fit through the plunger head 37', above which they are provided with (preferably adjustable) abutments 41, adapted to be engaged by said head whenever the plunger has the abnormal upward stroke above referred to.

The manner of supporting the mold may be as follows: The outer mold member 16 is secured by means of brackets 42 to the posts 27, and is normally braced against downward pressure by the upper end of a supporting section 43 of cylindrical or other suitable shape, engaging the floor 44 on which the lower edge of the member 16 is set, but this floor might be omitted, in which case the supporting section would, when in normal position, engage the mold member 16 itself.

The inner mold member 17 is shown as connected (say by brackets 17') with a table 45 normally resting on an annular section 46, surrounded by the section 43, and, like it, carried by a ram or other vertically movable member 47, which, during the operation, is held in its upper position to keep the sections 43, 46 up against the floor 44 or mold member 16 and the table 45 respectively, by means of removable blocks or segments 48 interposed between the base 28 and the head 47' of the ram. The parts 43, 46, 47, may however, be dropped to leave a clear space under the mold, as explained below.

If desired, a number of friction plates or brakes 49 may be hinged or otherwise secured at a plurality of points beneath the table 45 and held in adjusted position by means of screws 50, as shown in Fig. 1, to engage the bottom ring 25 and the bases 22 of the finished articles as the latter emerge from the mold, and to oppose any desired frictional resistance to the downward progress of such articles.

The steam and water connections for the inner jackets 18 and 19 respectively, may be constructed as follows: The inner annular supporting member 46 is made with inlet channels 51, 52, the lower ends of which are connected with movable pipes 51', 52' for the supply of steam and water respectively, these pipes being able to follow the member 46 in its vertical movement. The upper ends of the channels 51, 52 are adapted to register with channels 54, 55 in the table 45 and inner mold member, said channels 54, 55 communicating respectively with the steam jacket 18 and the water jacket 19. Preferably check valves 54', 55' are located in these channels to prevent the escape of steam or water through the jacket inlets at the time the member 46 is moved away from the mold member 17. When the member 46 is in the raised position, the tightness of the steam and water connections at said inlets is insured in any suitable way, as by rubber washers 56, 57 carried by the member 46. Similarly, the member 46 has outlet channels 58, 59 for steam and water respectively, said channels being adapted to communicate with outlet channels 60, 61 in the mold member 17 and table 45, the channels 60, 61 communicating with the jackets 18, 19, the channel 61 preferably terminally at the portion of the jacket 19. Washers 62, 63 may be employed for the same purpose as the washers 56, 57.

Figs. 2, 3 and 6 show the ram 47 in connection with its cylinder 64, supported on the base 28, and the rods 26 extend downwardly, their lower ends being adapted to rest on a stationary part, say a ledge 64' on said cylinder. Preferably the rods 26 extend through radial slots 65, the purpose of which is to allow the rods to be adjusted inwardly and outwardly according as mold members 16, 17 of different diameters are employed; the ram head 47' with the supporting sections 43, 46 is exchangeable for this purpose. The rods 26 are guided through suitable openings in the ram head 47'. These rods may be raised manually or otherwise for a purpose to be stated presently, and their downward movement relatively to the ram head 47' may be governed by an adjustable resistance provided by the brake shoes 66', carried by said head and adjustable by suitable means such as screws 66 extending through brackets 47'' on said head. The length of the rods 26 is preferably such that when the head 47' is in its upper position, the rods may be raised to bring their upper ends near the top of the mold chamber 15.

The operation may be conducted as follows: The supporting sections 43, 46 being in their uppermost position (held up by the blocks or segments 48) and the rods 26 in their uppermost position just referred to, and shown in Fig. 5, the plunger 37, follower 38 and feed funnel extension 36 are raised to their uppermost position to afford access to the mold chamber 15. A bottom ring 25 and a base 22 are then inserted into said mold chamber from the top, to rest on said rods 26, it being understood that the brakes 66' oppose a sufficient resistance to prevent downward movement of these rods except in response to the pressure of the plunger 37 as hereinafter referred to. I desire it to be distinctly understood, however, that the resistance to the downward movement of the ring 25 may be obtained in other ways than by using the brakes 65 in connection with the rods 26. The plunger 37 is then lowered sufficiently to allow the follower 38 to engage said base 22, and the extension 36 to assume its lower position shown in Fig. 1. The trough 30 having been filled with material as hereinbefore described, the distributing plate 32 is rotated while holding the trough stationary, steam and water are turned on by opening suitable valves (not shown) to supply the inner and outer jackets, and the compressing plunger 37 is reciprocated up and down, say with a stroke the upper and lower limits of which are indicated by the lines A, B respectively of Fig. 1. It will be seen that at the upper limit, the plunger is slightly above the lower end of the extension 36 so as to open up an annular slit through which a certain amount of material may pass from said funnel extension into the mold chamber 15. The follower 38 prevents this material from working its way above the upper flange of the base 22. At each down stroke the plunger compresses a continuous annular layer of material, and successive operative strokes will thus produce superposed continuous layers. The pressure of the plunger will feed the material downward gradually, together with the base 22, the bottom ring 25, and the rods 26. At each up stroke the plunger rises momentarily to the position shown in Fig. 1, so that another portion of powdered material may pass to the chamber 15 from the funnel 35, it being understood that the distributing plate 32 is kept rotating during the progress of the forcing operation. It will be obvious that the number of plunger strokes required to complete the tire will be much smaller than if the tire were made by the usual lengthwise forcing process. Moreover the lamination of the tire longitudinally with continuous annular layers will result in the production of a tire of a strength greatly superior to that of tires in which the lamination is transverse.

The fact that the lower end of the extension 36 is slightly above the member 16 allows the dropping of the rubber from said extension to be watched so as to ascertain at a glance if this part of the apparatus is working properly. However, it is not necessary to leave such a space for observation, that is to say, the extension 36 might engage the outer mold member.

When the first tire has been completed (which may be ascertained in different ways, say by the fact that the entire amount of rubber originally contained in the trough 30 has been transferred to the mold chamber 15) the plunger 37 is given a downward stroke of abnormal length, say to the level indicated at C in Fig. 1, to provide a space for the insertion of a separator ring 23 and another base 22, after the plunger has been raised to the uppermost position above referred to and indicated at D. Then the plunger is again reciprocated between A and B, the trough 30 having been refilled, and a second tire is made in the same manner as described above. This cycle of operations is repeated, as will be readily understood, and thus the tires, with their molding and separator rings 25, 23 gradually approach the lower end of the mold chamber 15. During this movement, the articles are cured by the heat in the upper jackets, said heat acting at first gently owing to the fact that the extreme upper end of the apparatus projects beyond the heating jackets. The bottom ring 25 and separators 23 also act as means for conveying heat from the jackets 18, 20 and from the walls 16, 17 to the rubber compound or other material, and for retaining such heat.

Of course, it is not necessary to employ the particular feeding device illustrated. In most cases it will be desirable to have the rubber adjacent to the base 22 of a different composition from the one used for the tread portion, and such composition 24' may be wrapped or otherwise secured to the base 22 before the latter is placed in the mold chamber, the funnel 35, 36 in this case supplying the balance of the rubber for making the tire. In this connection, it is a great advantage to have separate steam connections for the two heating jackets, enabling the base portion 24' to be heated to a different temperature from the tread portion 24, as may be required by the different character of the rubber compositions. I am thus enabled to cure the inner portion 24' differently from the outer portion 24, so that the former will be harder and will become practically inseparable from the base 22. It will be understood that the latter may be roughened in the usual manner to effect a better connection with the tire.

After a certain time, the bottom ring 25 and the lowermost tire will emerge from the bottom of the mold chamber 15, said ring and the base 22 of said tire being engaged by the friction members or brakes 49, which assist in partly relieving the rods 26 of the increasing weight of the tires. Of course, within the mold chamber, the friction of the expanding rubber against the inner wall of the outer mold member 16 is so great as to itself exert a very material resistance or braking action, but this action ceases when the tire emerges from the chamber 15.

The cooling effect of the water jackets is beneficial in shortening the time required for finishing the articles, and in facilitating the passage of the tires out of the mold chamber. The contraction obtained by this cooling insures a gradual release of pressure and thus avoids the possible detrimental effects of a sudden release of pressure. However, such cooling is not absolutely essential, and might be omitted in a great many cases.

Finally, the lower ends of the rods 26 come to rest on the support or ledge 64', and at this time the upper ends of the rods 26 are at the level of a floor 67, Fig. 2. The stack of tires below the mold chamber 15 is now to be removed. For this purpose (after shutting off the water and steam, at least from the inner jackets) the blocks or segments 48 are removed, and the ram 47 with the supporting sections 43, 46 is dropped below said floor 67—or at least to its level. This opens a clearance through which I can remove readily all the tires above the rods 26, up to and excluding the tire which at that time is engaged by the brakes 49. These brakes will help to prevent the dropping of said tire when those beneath it have been removed.

The ram 47 with the sections 43, 46 and rods 26 will then be raised again, said rods coming into supporting engagement with the separator ring 23 at the bottom of the tire engaged by the brakes 49.

The operation is thus repeated in stages. The space through which the completed tires are removed is preferably of a height slightly greater than that of the mold chamber 15, and may in this case also be utilized for the insertion of the inner mold member 17 with its jackets. The very considerable friction between the compressed rubber and the wall of the inner member 17 will probably be sufficient to keep this member from following the downward movement of the supporting section when the latter is lowered; still, if desired, a temporary support might be provided for said mold member 17, say by hooks 17'' adapted to engage pins on a stationary part, say pins 40' on the bars 40; of course, these hooks would have to be swung out of the way for the insertion of bases 22 or molding rings 23, 25 into the mold chambers 15 from above.

While I have referred to the making of a tire with a base such as 22, it will be obvious that other articles of varied types may be produced according to this invention. In the case of the article shown in Fig. 1, the inner wall of the mold chamber 15 serves simply as a guide for the bottom ring 25, the separator rings 23, the bases 22, and the follower 38, but forms no part of the molding surface, which is composed of the outer wall of said chamber, together with the upper and lower faces of the separator ring, the upper face of the bottom ring 25, the lower face of the compressing plunger 37, and the outer face of the base 22. In some cases, however, as in Figs. 10 and 13, both walls of the mold chamber might form part of the molding surface, say in making washers 24'', Fig. 13. Fig. 10 shows the making of solid tire 24ª without any bases 22, and preferably in this event the tires would be left relatively soft, so that after removal from this apparatus they could be stretched or sprung over bases such as 22, and then finished, say by heating them in a vulcanizer of any usual or approved type. Of course, in cases of the character exemplified by Figs. 10 and 13, the plunger 37' or 37'' would be of such a width as to engage both walls of the mold chamber 15, the follower 38 being dispensed with.

The surfaces of the mold chamber 15, while continuous and giving said chamber a uniform cross section from top to bottom so as to properly guide the articles and molding rings, need not be perfectly smooth, but might be ribbed or grooved vertically, the compressing plunger in each case having a cross section corresponding to that of the mold chamber. Thus, Fig. 12 shows a construction in which the inner wall of the chamber 15 is smooth (cylindrical), while the outer wall is ribbed, thereby providing (preferably detachable) vertical bars 16". The plunger 37ᵃ is of a correspondingly grooved type.

In some cases, as suggested in Fig. 11, sectional rings 68 may be applied in contact with the outer portion of the rubber, after a certain number of compression strokes, the operation being then continued to form a groove containing said ring, and after the article has been withdrawn from the molding apparatus, the sections of the ring can be removed from the tire, which will thus be formed with a circumferential groove.

Instead of employing a powdered rubber compound as the material to be shaped, I may employ any other suitable powdered or granular material, or any appropriate coherent plastic mass. In the case of a mass which is coherent initially, the intermittent pressure by successive blows as described above, is not necessary, and a single blow compressing stroke of greater length may be employed to mold the material and feed it toward the outlet of the mold chamber with the separator rings.

While I have shown a mold chamber 15 with walls of circular cross section (horizontal section), I do not wish to limit myself to this species when I speak of an annular mold chamber, but mean to include under this term any chamber of a proper shape to form a continuous or endless article with an opening or clearance in its center. Many features of my invention, however, are not restricted to use in conjunction with annular mold chambers, and thus the articles produced need not be endless in every case.

It will be noted that the shape of the active surface of the compressing plunger, and the shape of the portion of material subjected to pressure, corresponds to that cross section of the finished article which has the greatest area.

While in most of the forms illustrated by the drawings of this application, the walls of the chamber 15 are concentric and parallel, this (as indicated above in connection with Fig. 12) is not essential, it being sufficient that the walls of the said chamber shall be composed of longitudinal rectilinear elements parallel to the path of the compressing plunger. That is to say if the plunger movement is vertical, as in the drawings, it will be sufficient that the walls of the chamber be composed of vertical line elements, even though the two walls of said chamber might lack parallelism, as in Fig. 12. Thus the cross section of the mold chamber will be the same in any plane perpendicular to its length and to the path of the plunger.

While I have described and shown satisfactory and preferred embodiments of my invention, I desire it to be understood that various modifications may be made within the spirit and scope thereof as set forth in the appended claims.

While I have referred to the chamber 15 as being of uniform cross section from top to bottom, so that both walls of said chamber may form guides for the separator rings, throughout their travel within said chamber, I desire it to be understood that in some cases this uniformity of cross section may be dispensed with, particularly when the forcing operation is performed without the use of separators. The chamber in which the compressing plunger works may thus taper or contract toward the outlet (downwardly) by making either one or both of its walls oblique with reference to the plunger path, and this contraction may occur only at that portion of the chamber in which the compressing stroke of the plunger occurs, or for a greater portion of said chamber, and even throughout its length. An arrangement of this type is shown in Fig. 14, where 15' is the downwardly tapering portion of the annular chamber 15; this form of apparatus may be employed for making hose or other tubular articles.

Claims:

1. An apparatus of the character described, comprising a mold chamber to receive the material to be shaped, feeding means arranged at one end of said chamber and including a material directing member at the outer side of the chamber, a compressing plunger movable into and out of said end of the chamber and coöperating with said directing member to cut off the further feed of the material upon the entrance of the plunger into said chamber, and relatively stationary means at the opposite side of the chamber to prevent the overflow of the material therefrom.

2. An apparatus of the class described, comprising two spaced guide walls forming between them a chamber adapted to receive molding members and the material to be shaped, the opposing surfaces of said guide walls being formed of parallel longitudinal line elements so that said chamber is of the same cross section at different points of its length, non-communicating jackets for said walls, located at different points of the length of said chamber, so that one portion of the chamber may be heated, and another portion cooled, and means for exerting pressure between said walls, lengthwise of said chamber.

3. An apparatus of the class described, comprising two spaced guide walls forming between them a chamber adapted to receive molding members and the material to be shaped, the opposing surfaces of said guide walls being formed of parallel longitudinal line elements so that said chamber is of the same cross section at different points of its length, a jacket for one of said walls, a separate jacket for the outer wall, independent means for supplying a heating medium to each of said jackets whereby the two walls may be subjected to different temperature conditions, and means for exerting pressure between said walls, lengthwise of said chamber.

4. An apparatus of the class described, comprising two spaced guide walls forming between them a chamber adapted to receive molding members and the material to be shaped, the opposing surfaces of said guide walls being formed of parallel longitudinal line elements so that said chamber is of the same cross section at different points of its length, jackets for said walls, located at different points of the length of said chamber, independent means for supplying a fluid medium to each of said jackets so that the articles passing through said chamber may be subjected successively to heating and to cooling influences, the jackets of one wall being separate from those of the other wall, whereby the same cross sectional portion of the chamber may be subjected to different temperature conditions adjacent to the respective walls, and means for exerting pressure between said walls, lengthwise of said chamber.

5. An apparatus of the class described, comprising two spaced guide walls forming between them a chamber adapted to receive molding members and the material to be shaped, the opposing surfaces of said guide walls being formed of parallel longitudinal line elements so that said chamber is of the same cross section at different points of its length, said chamber being open at one end for the egress of the articles shaped therein, heating jackets for said walls, terminating short of the opposite end of said chamber, and means for exerting pressure between said walls, lengthwise of said chamber and toward said open end.

6. An apparatus of the class described, comprising a mold chamber to receive the material to be shaped, a compressing plunger movable longitudinally into one end of said chamber, means for feeding the material into said end of the chamber, and relatively stationary guard means carried by the plunger and preventing the overflow of the material from said chamber.

7. An apparatus of the class described, comprising a mold chamber to receive the material to be shaped, a compressing plunger movable longitudinally into one end of said chamber, means for feeding the material into said end of the chamber, at one side thereof, and a follower carried by said plunger and extending longitudinally from the chamber at the opposite side thereof to prevent the overflow of the material from said chamber.

8. An apparatus of the character described, comprising a mold chamber adapted to receive the material to be shaped, a compressing plunger longitudinally movable in said chamber, a feeding device having a movable discharge member normally disposed adjacent to the inlet end of said chamber, and a common means for operating said plunger and for moving said discharge member of the feeding device to an inoperative position upon an abnormal movement of the plunger in one direction.

9. An apparatus of the class described, comprising an annular mold chamber to receive the material to be shaped, annular feeding means for equally distributing the material to said chamber arranged at one end of the chamber, a compressing plunger mounted at the same end of said chamber and movable into and out of the mold chamber and adapted to coöperate with a part of said annular feeding means to cut off the further feed of the material upon the entrance of the plunger into said chamber.

10. An apparatus of the class described comprising two spaced guide walls forming between them an annular chamber adapted to receive molding members and the material to be shaped, and an annular compressing plunger movable lengthwise of said chamber along the outer wall thereof, and a follower movable lengthwise of said chamber, adjacent to the other wall thereof.

11. An apparatus of the class described, comprising two spaced guide walls forming between them an annular chamber adapted to receive molding members and the material to be shaped, an annular compressing plunger movable lengthwise of said chamber, adjacent to one wall thereof, and a follower movable lengthwise of said chamber, adjacent to the other wall thereof.

12. An apparatus of the class described, comprising two spaced guide walls forming between them a chamber adapted to receive molding members and the material to be shaped, a compressing plunger movable lengthwise of said chamber, to force the molding members and the molded material toward the outlet end of said chamber, and brake mechanism located at the outlet of said chamber, to retard the movement of said molding members and molded material.

13. An apparatus of the class described, comprising two spaced guide walls forming between them a chamber adapted to receive molding members and the material to be shaped, means for feeding material to said chamber at one end thereof, a compressing plunger movable lengthwise of said chamber to force the molding members and the molded material toward the other end of said chamber, and brake mechanism located at said other end, to retard the movement of the molding members and molded material.

14. An apparatus of the class described, comprising two spaced guide walls forming between them an annular chamber adapted to receive molding members and the material to be shaped, annular feeding means located at the inlet end of said chamber, and an annular compressing plunger movable lengthwise of said chamber and coöperating with the discharge end of said feeding means to cut off the further feed of the material.

15. An apparatus of the class described, comprising two spaced guide walls forming between them an annular chamber adapted to receive molding members and the material to be shaped, annular feeding means for supplying material to one end of said chamber along its entire periphery and including relatively rotatable feed control members, and an annular compressing plunger movable lengthwise of said chamber.

16. An apparatus of the class described, comprising two spaced guide walls forming between them an annular chamber adapted to receive molding members and the material to be shaped, an annular feed trough located adjacent to the inlet end of said chamber, a distributing member movable at the bottom of said trough to cause the material to be discharged therefrom, and means for exerting pressure within said chamber.

17. An apparatus of the class described, comprising two spaced walls forming an annular chamber, an annular feed trough located adjacent to the inlet end of said chamber, a distributing member mounted to turn at the bottom of said trough about the axis of said chamber to cause the material to be discharged from said trough, and means for exerting pressure within said chamber.

18. An apparatus of the class described, comprising two spaced walls forming between them an annular chamber, an annular feed trough located adjacent to the inlet end of said chamber and provided with a perforated bottom, a distributing plate arranged to rotate relatively and adjacent to said bottom, about the axis of said chamber, and provided with perforations adapted to come into and out of registry with those of said bottom, means for affecting a relative rotation of said plate and bottom, and means for exerting pressure within said chamber.

19. An apparatus of the class described, comprising an annular mold chamber open at its ends, a compressing plunger to operate within one end of said chamber, spaced annular walls forming an annular chamber at the other end of the mold chamber, and a longitudinally movable support in the latter annular chamber to receive the molded articles from the mold chamber.

20. An apparatus of the class described, comprising an annular mold chamber open at its ends, a compressing plunger to operate within one end of said chamber, spaced annular walls forming an annular chamber at the other end of the mold chamber, a longitudinally movable support in the latter annular chamber to receive the molded articles from the mold chamber, and means for moving said spaced annular walls relative to the mold chamber to permit of the removal of the articles.

21. An apparatus of the character described, comprising an annular mold chamber open at its ends, a second annular chamber in axial alinement with the mold chamber and communicating therewith, a support movable in said second annular chamber and adapted to receive the molded articles from the mold chamber, and means for moving the walls of the second annular chamber relative to the support to permit of the removal of the molded articles.

In testimony that I claim the foregoing as my invention, I have signed my name.

FRITZ OFFENHÄUSER.